United States Patent
Codato et al.

(10) Patent No.: US 11,043,824 B2
(45) Date of Patent: Jun. 22, 2021

(54) METHOD TO CHARGE A BATTERY PACK AND BATTERY CHARGING CIRCUIT TO CHARGE A BATTERY PACK

(71) Applicant: Datalogic IP Tech S.r.l., Calderara di Reno (IT)

(72) Inventors: Sandro Codato, Lippo di Calderara di Reno (IT); Paolo Mazzocato, Casier (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 139 days.

(21) Appl. No.: 16/198,468

(22) Filed: Nov. 21, 2018

(65) Prior Publication Data

US 2019/0157879 A1 May 23, 2019

(30) Foreign Application Priority Data

Nov. 21, 2017 (IT) .......... 102017000133112

(51) Int. Cl.
*H02J 7/00* (2006.01)
(52) U.S. Cl.
CPC .......... *H02J 7/0021* (2013.01); *H02J 7/0013* (2013.01); *H02J 7/0018* (2013.01)
(58) Field of Classification Search
USPC .......................................................... 320/126
See application file for complete search history.

(56) References Cited

U.S. PATENT DOCUMENTS

| | | | |
|---|---|---|---|
| 8,598,847 B2 | 12/2013 | Eberhard et al. | |
| 2001/0019256 A1* | 9/2001 | Olsson | H02J 7/0016 320/118 |
| 2005/0275373 A1 | 12/2005 | Guang et al. | |
| 2008/0174263 A1 | 7/2008 | Ghode et al. | |
| 2011/0298626 A1* | 12/2011 | Fechalos | H01M 10/482 340/664 |
| 2012/0194135 A1* | 8/2012 | Mizoguchi | G01R 31/396 320/118 |
| 2014/0203780 A1 | 7/2014 | Hu et al. | |
| 2015/0035492 A1* | 2/2015 | Nomura | H02J 7/007 320/126 |
| 2017/0054134 A1 | 2/2017 | Choi et al. | |

FOREIGN PATENT DOCUMENTS

GB 2506175 A 3/2014
WO 2017192751 A1 11/2017

OTHER PUBLICATIONS

Italian Search Report and Opinion corresponding to Italian Patent Application No. 102017000133112, filed Nov. 21, 2017, 9 pages.

\* cited by examiner

*Primary Examiner* — Samuel Berhanu
(74) *Attorney, Agent, or Firm* — Foley & Lardner LLP (57) ABSTRACT

A method to charge a battery pack including a plurality of cells connected in parallel, the method including setting a plurality of set cell charging current, a set cell charging current for each cell of the battery pack; charging the battery back with a total current from a single current source; sensing a plurality of cell currents which flows through each cell of the battery pack; comparing a value proportional to each set cell charging current with a value proportional to the cell current for the same cell; and modulating each cell current on the basis of the comparison for the same cell. A battery charging circuit for a battery pack is also provided.

18 Claims, 7 Drawing Sheets

METHOD TO CHARGE A BATTERY PACK AND BATTERY CHARGING CIRCUIT TO CHARGE A BATTERY PACK

RELATED APPLICATION

This application claims priority under 35 U.S.C. 119 or 365 to co-pending Italian Patent Application No. 102017000133112; the contents of which are hereby incorporated by reference in their entirety.

FIELD OF THE INVENTION

The present invention relates to a battery charging circuit for a battery pack where cells (battery cells) of a plurality are connected in parallel. Further, the invention relates to a method to charge the battery pack.

BACKGROUND

In a battery pack, the cells in parallel group are generally of the same kind. However, their electrical characteristics may be not exactly identical. This can be due to several reasons, for example, the cells may originate from different production batches, may have experienced different environmental stocking conditions or may have different tolerances.

This difference which may be present among cells of the same battery pack may cause problems during the charging. Indeed, the charging current maybe imbalanced due to the different series impedance of the cells, because the current provided by the charger, mainly flows through the cell which has the lowest impedance.

Further, when the pack is assembled in the factory, if cells do not have the same voltage, current can flow from one cell to the other(s) in an unpredictable way.

Different currents in the different cells may also lead to different aging of the cells. There is also the risk of having, for a given cell, a too high current which may cause fast aging.

In order to avoid the aforementioned problems, in the prior art, care has been taken to select cells as similar as possible to build a battery pack, and fuses were interposed between cells.

SUMMARY

The principles described herein relate to a method to charge a battery pack in which the cells are connected in parallel and to a battery charging circuit where at least one or more of the problems listed are solved. In particular, the principles described herein aim at solving the problems in a simple manner and involving an addition of components to an already designed charger of a battery pack already available, so that the charger does not need to be re-designed or only in part.

According to a first aspect, a method to charge a battery pack, where the battery pack includes a plurality of cells connected in parallel, the method including:

setting a plurality of set cell charging currents, a set cell charging current for each cell of the battery pack;

charging the battery back with a total current from a single current source;

sensing a plurality of cell currents which flows through each cell of the battery pack;

comparing a value proportional to each set cell charging current with a value proportional to the cell current for the same cell; and modulating each cell current on the basis of the comparison for the same cell.

According to a second aspect, a battery charging circuit for a battery pack may include a plurality of cells connected in parallel and connected to a current source, the battery pack including:

a sensing element apt or configured to sense a total current provided by the current source;

a plurality of cell sensing elements apt to sense a cell current flowing through each cell of the plurality;

a partitioner apt to divide the total current in a number of set cell charging currents equal to the number of cells in the plurality;

a plurality of comparators, each comparator apt to compare a value proportional to each set cell charging current with a value proportional to the cell current for the same cell; and a plurality of modulators, each modulator apt to modulate the cell current on the basis of the comparison.

The battery pack to be charged by the method or the battery charging circuit of the invention may include at least two cells, any number of cells equal or above two is possible. Therefore, the term plurality indicates a number of cells $N \geq 2$. The cells in the battery pack are connected in a parallel configuration.

The cells in the battery pack may have similar characteristics or may be quite different from each other (for example different capacity, chemistry or desired charging current).

The battery pack is charged by an external current source. The current source can be, for example, the means to which the charger is connected. The battery charging circuit may suitably process the current coming from the current source to render it suitable for battery charging. This transformation is well known in the art, and it is not further discussed below. The total current indicated is therefore the total current provided by the charger according to the prior art.

This total current is then split in a plurality of sub-currents, each sub-current for a single cell of the pack. If this splitting is left uncontrolled, the total current is going to split differently among cells depending on their electrical characteristics.

In order to correctly charge the battery pack, each cell has a desired or preferred charging current. This desired or preferred charging current is known a priori. Therefore, for each cell of the battery pack, a suitable set cell charging current can be defined. The sum of the set cell charging currents for all cells in the battery pack may be equal to the total current charging the battery pack itself.

The set cell charging current can be, for example, stored in a memory, for example present in a microprocessor. Alternatively, the desired partitions of the total current in a plurality of set cell charging currents can be performed by active or passive elements, such as a suitable voltage divider, operational amplifiers, and so on.

These set cell charging currents are the currents that would give an optimal charging to each of the cell of the whole battery pack. The set cell can be all equal to each other, in case the cells in the battery packs are considered to be the same, or different in the case the battery packs are considered to be different from one another. The number of set cell charging currents is commonly equal to the number N of cells in the battery pack; in a different embodiment, the number of set cell charging currents is N−1 because the total incoming current (Itot) is known at priori. Therefore, when the N−1 currents are set, the Nth current for the last cell is also set being equal to $I_{Nth}=I_{tot}-\Sigma\_1^{(N-1)} I\_k$.

In order to have in reality a current flowing in each cell of the battery pack equal, or at least approximately equal, to the set cell charging current chosen for that specific cell, the method and battery charging circuit may include the feature of sensing the current flowing in each cell. Sensing the current flowing in each cell allows for determining whether the current is equal to the set charging current, or whether there are differences to be corrected.

In order to sense such current, for example, a voltage proportional to the current can be sensed. The cell and a resistance can be connected in series, so that the current flowing through a cell is also the current flowing through the resistance and the voltage difference between the two ends of the resistance can be an input of a comparator so that the comparator is used to compare the current with a voltage function of the desired set cell charging current for the same cell. However, any method or device can be used to determine the real current flowing in each cell. The current flowing in the cell can be measured either directly or indirectly, that is, measuring a value which is a function of the current, such as a voltage that is proportional to the current.

Thus, a sensing element is any element that may give as possible output a value proportional to that current (for example, a voltage).

A feedback is then implemented, so that, in case the current flowing in the cell is not equal to the set current then the current flowing in the cell is modulated so that the difference between the current flowing in the cell and the set charging current from the same cell becomes as small as possible.

This feedback is obtained preferably by means of a comparator that compares the two currents (the desired set current and the real flowing current). A signal function of the difference between the two currents, or between values that are proportional to the two currents (for example, voltages), is fed to a modulator that is apt to modulate the current flowing into each cell.

The modulator may be considered, for example, as a variable resistance that changes impedance depending on the difference between the above-mentioned current and positioned in series with the cell so as to change the impedance and the overall current flowing through the cell changes (the overall impedance of the cell plus resistance changes the portion of the total current flowing in the branch of the circuit where the cell is present).

This continuous feedback allows for maintaining the currents flowing in the cells as close as possible to the desired set currents.

The requirement of selecting cells within the same battery pack as similar as possible is not needed any more: the set currents can be different one from the other to accommodate also battery packs having very different cells.

Further, the control of every current flowing in the cells avoid any undue stress to the cells and ensure the same aging, also when relatively large current are used in order to obtain very short recharge time.

According to the first or second aspect, the principles described herein may include, in addition or as alternatives, any of the following characteristics.

In an embodiment, modulating the cell current includes lowering the cell current if the desired charging current is lower than the measured cell current or increasing the cell current if the desired charging current is higher than the measured cell current.

The modulation may be performed in such a way that during the comparison a verification as to whether the cell current is really flowing through each cell is either higher, lower, or equal to the desired set charging current for the same cell. On the basis of the comparison, the scope of the modulation is to bring the current flowing into the cell as close as possible to the set current and thus the modulation either lower or raises the flowing current through the cell depending on whether it is higher or lower, respectively, than the set current for the same cell.

In an embodiment, in setting a plurality of set cell charging currents, a set cell charging current for each cell of the battery pack, may include:

dividing the total current in a number of sub-currents equal to the number of cells; and defining each set cell charging current as proportional to one of the sub-currents.

The sum of all the set current may be equal to the total current that is charging the battery pack. The total current is thus divided in a plurality of "sub-currents," each of which defines a set current. The total current can be divided in equal parts, so that all sub-currents are identical, or in different parts, so that the sub-currents have different values.

As described above, set N−1 currents, where N is the number of cells, the Nth current is set as well being the total current fixed.

In order to avoid damages to the battery pack, a limit, or maximum threshold, for the maximum current that is allowed to charge the battery pack is set. A protection circuit between the current source and the battery pack is therefore provided.

In an embodiment, the method includes, in a discharge phase:

uncoupling each cell from the other cells of the plurality by means of ideal diodes.

At the end of the charging process, due to possible different electrical characteristics among cells, current may flow from one cell to the others.

In order to avoid or limit this phenomenon, cells can be uncoupled, for example by means of ideal diodes.

In a different embodiment, the cell which has the highest voltage, may provide current to the others, in a current-limited (so, safe) condition, until all the voltages are equal.

In another embodiment, each modulator of the plurality of modulators is connected in series with a respective cell.

Each modulator therefore receives as input a command, which depends on the difference between the set current and the real current flowing through that cell. On the basis of the above-described command, it is thus possible to modify the current flowing in each cell.

Each comparator may independent drive a corresponding modulator for each cell.

Each cell current is thus controlled independently from the others.

In one embodiment, the comparator includes an operational amplifier in a comparator configuration. For example, each of operational amplifiers in a comparator configuration has as input a value proportional to each set cell charging current and a value proportional to the cell current flowing in the same cell. This last value (i.e. of the current really flowing in the cell) can be obtained for example via the sensing element which senses the amount of current flowing in the cell.

The amplifier compares these two values and the output depends on the difference.

In an embodiment, the modulator includes a transistor, the collector of the transistor being connected to one end of the cell. The base of the transistor may be connected to an output of the comparator.

For example, the transistor can be a MOSFET. The transistor may be positioned in series to the cell and receives at its collector (Drain) the current flowing through the cell. The base of the transistor is driven by the output of the operational amplifier that is proportional to the difference between the cell current flowing in the cell and the set charging current for the same cell. Depending therefore on the value of this difference, the voltage applied to the base (Gate) of the transistor can vary. The current flowing through the transistor from collector to emitter (from drain to source) is thus modulated. This current is close to the current flowing through the cell and thus the cell current is modulated.

In one embodiment, the partitioner includes a voltage divider.

The voltage divider may include a plurality of electrical resistances. The current is first transformed in a corresponding voltage, and then the current is divided in a plurality of sub-currents (sub-voltages) on the basis of the values of the electrical resistances or impedances chosen in the voltage divider.

In another embodiment, the partitioner is part of a control unit. The control unit may include a microprocessor.

The microprocessor can divide the total current flowing into the battery pack in a number of set currents equal to the number of cells.

In one embodiment, the comparator is part of a control unit, where the control unit includes a microprocessor.

In this embodiment, the microprocessor can compare each set current for each cell to values proportional to the actual currents flowing in the same cells. The comparison output values can be sent to the modulators, either directly or "transformed" for example in corresponding voltages.

In an embodiment, the battery charging circuit comprises multiple diodes, where each diode is in series with a corresponding modulator.

The diodes are used to avoid to have a charge transfer from each cell to another at the end of the charging process.

The sensing element or the cell sensing element may include an electrical resistance.

In order to obtain a value of the current flowing through the cell of the battery pack, a simple electrical resistance positioned in series with the battery pack can be used. The voltage drop at the two ends of the resistance may be proportional to the current flowing in the cell. This voltage drop can be used as an input of the comparator so that the current flowing in the cell can be indirectly "sensed".

In one embodiment, the battery charging circuit includes a current to voltage converter to transform a current signal into a voltage signal.

This current to voltage conversion can be used to change values of currents into values of voltages that are more easily handled.

BRIEF DESCRIPTION OF THE DRAWINGS

Figure 1:
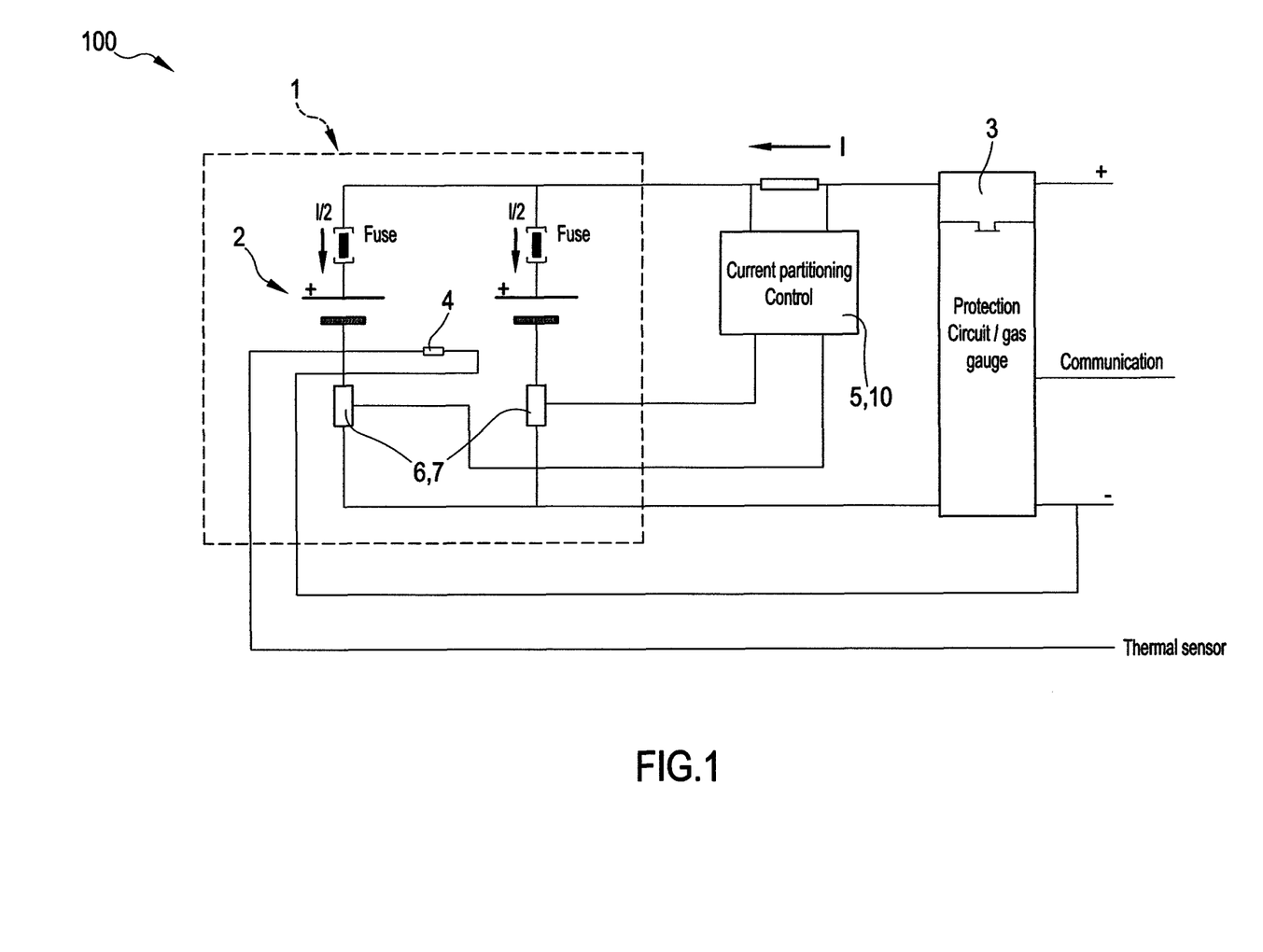
FIG. 1 is a schematic simplified drawing of a battery charging circuit according to the invention.

The principles described herein will be now described in more detail with reference to the appended drawings, wherein:

FIG. 1 shows in a simplified manner a battery charging circuit 100 apt to charge a battery pack 1 according to one embodiment.

The battery pack 1 includes a plurality of cells 2. In the examples depicted herein, the cells of the battery pack 1 are in the number of 2. However, any number N of cells 2 can be included in the battery pack 1. The cells 2 are electrically connected all in parallel configuration.

The battery charging circuit 100 includes an external portion, which supplies a total charging current ITOT to the battery pack 1. This current is coming from an external source known in the field and not further mentioned or described.

Between the external source and the battery pack 1, the battery charging circuit 100 includes a protection circuit 3, for example, a gas gauge, also known in the art. The protection circuit 3 avoids for example any of over-temperature, under-temperature, additional levels of over/under-voltage, discharge short circuit, discharge over-current, charge over-current, etc. Further, the protection circuit 3 may autonomously measures all cell voltages, integrated pack current and temperature (this latter for example by means of a thermal sensor 4). The gas gauge is already known in the art and not further discussed.

The battery charging circuit 100 of the invention further includes a partitioner 5 of the total current ITOT. The partitioner 5 divides the total current ITOT in a plurality of sub-currents, each of which defines a set current for a given cell 2. In other words, the partitioner 5 determines a plurality of currents, the sum of which is the total current ITOT, and each of these currents is associated with a cell 2 and defines the current that should flow in an ideal situation through that cell 2. These currents are called set currents.

Further, the battery charging circuit 100 includes for each cell 2, a sensing element 6, and modulator 7 for receiving the set current for that specific cell from comparator 10. In an embodiment, sense circuit and modulator are in series with their associated cell 2.

Sensing element 6 and modulator 7 work with a comparator 10 (indicated as present in the same "box" as the partitioner 5 in FIG. 1) that compares the set current for the cell with the real current flowing through the cell. Further, depending on the difference between these two currents, the current flowing through the cell 2 is modulated on the basis of this difference by modulator 7.

Figure 2:
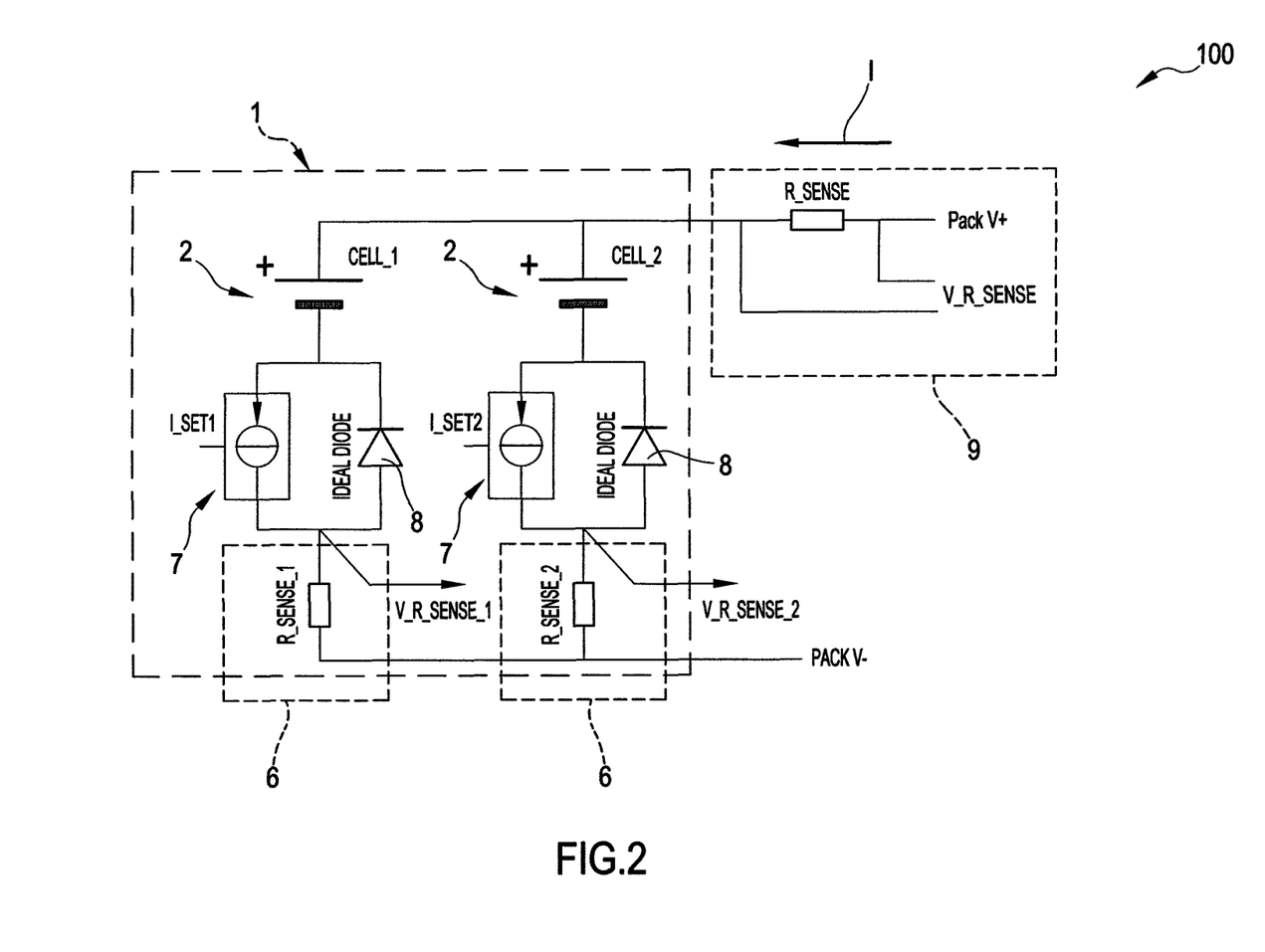
FIG. 2 is a schematic simplified drawing of a portion of the battery charging circuit of FIG. 1 in more detail.

FIG. 2 is a more detailed scheme of the sensing element 6/modulator 7 for each cell 2. The protection circuit 3 and control unit 5 are not depicted in this figure.

Each modulator 7 can be in parallel with diode that can be ideal (all diodes are indicated with 8 in FIG. 2).

In this example where only two cells 2 are depicted, the total current ITOT is divided in two set currents. The division of the total current into the set currents is performed by the partitioner 5. In order to divide the total current in the set currents, a measurement of the total current is thus used in an embodiment.

For this purpose, the battery charging circuit 100 includes a sensing element 9 of the total current ITOT, positioned before the partitioner 5. The sensing element 9 is in the depicted embodiment a resistance R_sense at the two ends of which a voltage difference V_R_sense which depends on the value of the total current can be measured. Therefore, from the sensing of the voltage difference and the value of R_sense (which is known), the value of the total current ITOT can be obtained.

The comparator 10/partitioner 5 receives as input the real current flowing through the cell 2 from sensing element 6. The comparator 10/partitioner 5 may receive the values of the currents directly or via a transformation, that is, it may receive as inputs values which are function of the mentioned currents.

The comparator 10/partitioner 5 therefore compares the set 2 currents with the real currents flowing through the cells and on the basis of the comparison send an input signal I_set1 or I_set2 to the modulator 7 that modulates the current flowing through the cell 2. I_set1 and I_set2 are function of the difference between the two currents (set and real). The sensing element 6 for each cell 2 is—as described—apt or configured to sense the current flowing in each respective cell 2. The sensing element 6 in a preferred embodiment includes an electrical resistance R_sense_1 or R_sense_2; measuring the voltage difference at the ends of each resistance V_R_sense_1, V_R_sense_2, a value proportional to the current flowing through the cell is obtained. This value of the voltage difference at the two ends of the resistance R_sense_1 and R_sense_2 is then also sent to the comparator 10.

Figure 3:
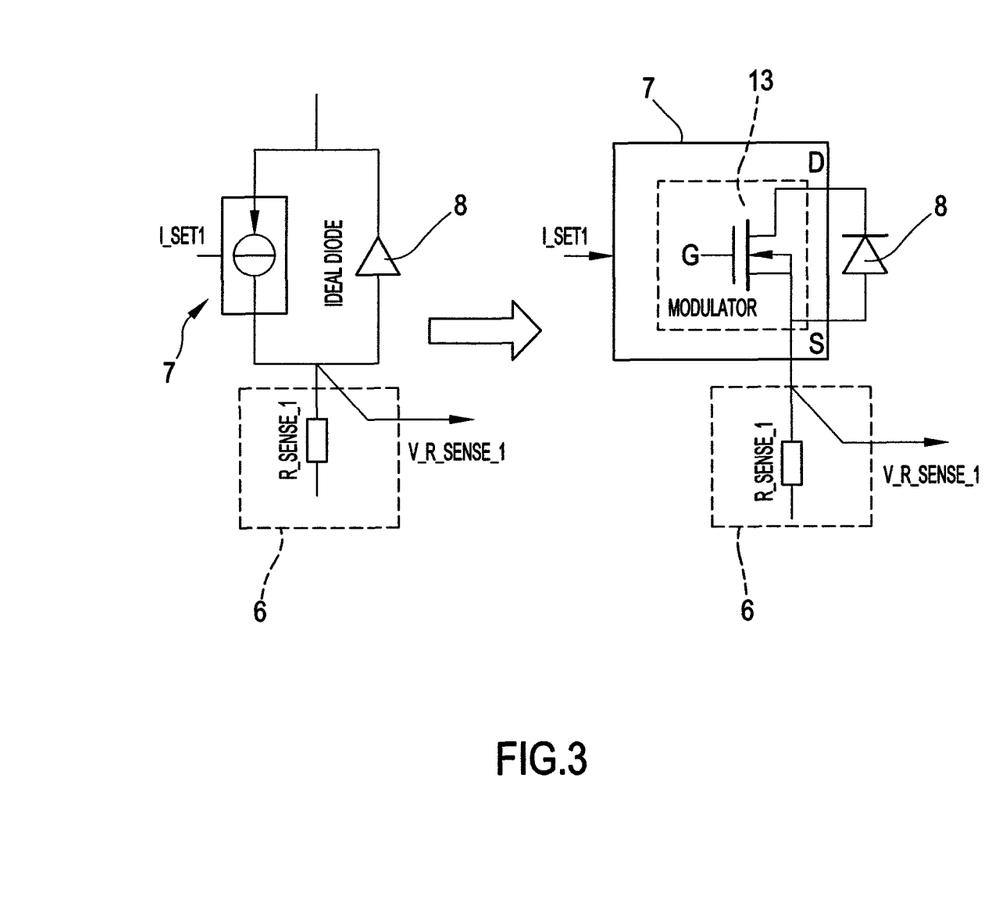
FIG. 3 is a detailed portion of battery charging circuit of FIG. 2.

In FIG. 3, a more detailed view of a possible embodiment of the modulator 7 is given. Only the modulator 7 for one cell 2 is depicted, the modulator for the other cells being identical, only receiving different input (which is anyhow always proportional to the difference between the set current and the real current flowing in that cell).

Figure 5:
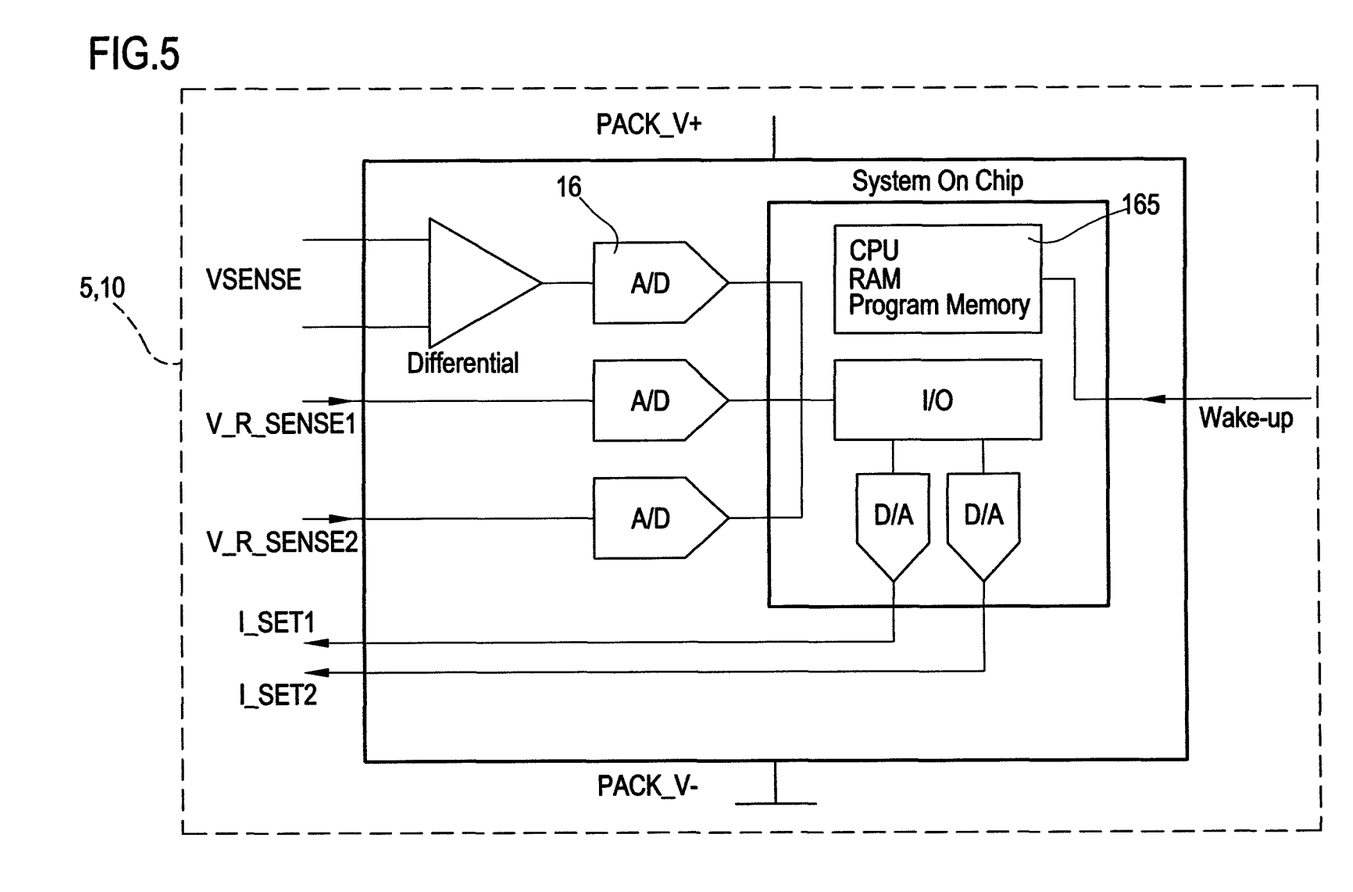
FIG. 5 is a second embodiment of the control unit of the battery charging circuit.

The modulator 7 may include a transistor and, in an embodiment, the transistor is a MOSFET 13, the drain D of which receives in input the current flowing through the cell 2 during charging. The gate G has in input the I_set1 signal coming from the comparator 10. Modulating the voltage at the gate of the MOSFET means that the current flowing through the cell is modulated as well. I_SET1 signal varies depending on the difference between the current flowing in the cell and the set current for that cell. In FIG. 5, an embodiment of the partitioner and comparator 10 is depicted. The partitioner 5 and comparator 10 are both included in a control unit, such as a microprocessor 15. The control unit may also include a plurality of analog-to-digital converters all indicated with 16.

The microprocessors 15 receives as inputs a value proportional to the total current ITOT (the voltage at the ends of the resistance Rsense, V_Rsense from sensing element 9), and the voltages present at the end of the sensing elements 6, V_Rsense_1 and V_Rsense_2 which are proportional to the real current flowing through the cells 2.

The microprocessor 15 also has the function of partitioner so it has the knowledge of the values of all set currents for each cell 2. Microprocessor 15 divides the total current value ITOT in the desired set currents according to a program which takes into account the type of cells present in the battery pack 100. The value of the set currents may be changed modifying the suitable program present in the microprocessor 15 if the battery pack is changed.

The microprocessor 15 compares each set current for each cell to the value proportional to the actual current flowing in the same cell (V_Rsense_1 and V_Rsense_2). The value of the set current for each cell 2 can be stored in a memory present in the microprocessor 15. The comparison output values I_SET1 and I_SET2 can be sent to the modulators 7, either directly or "transformed" for example in corresponding voltages.

Figure 4:
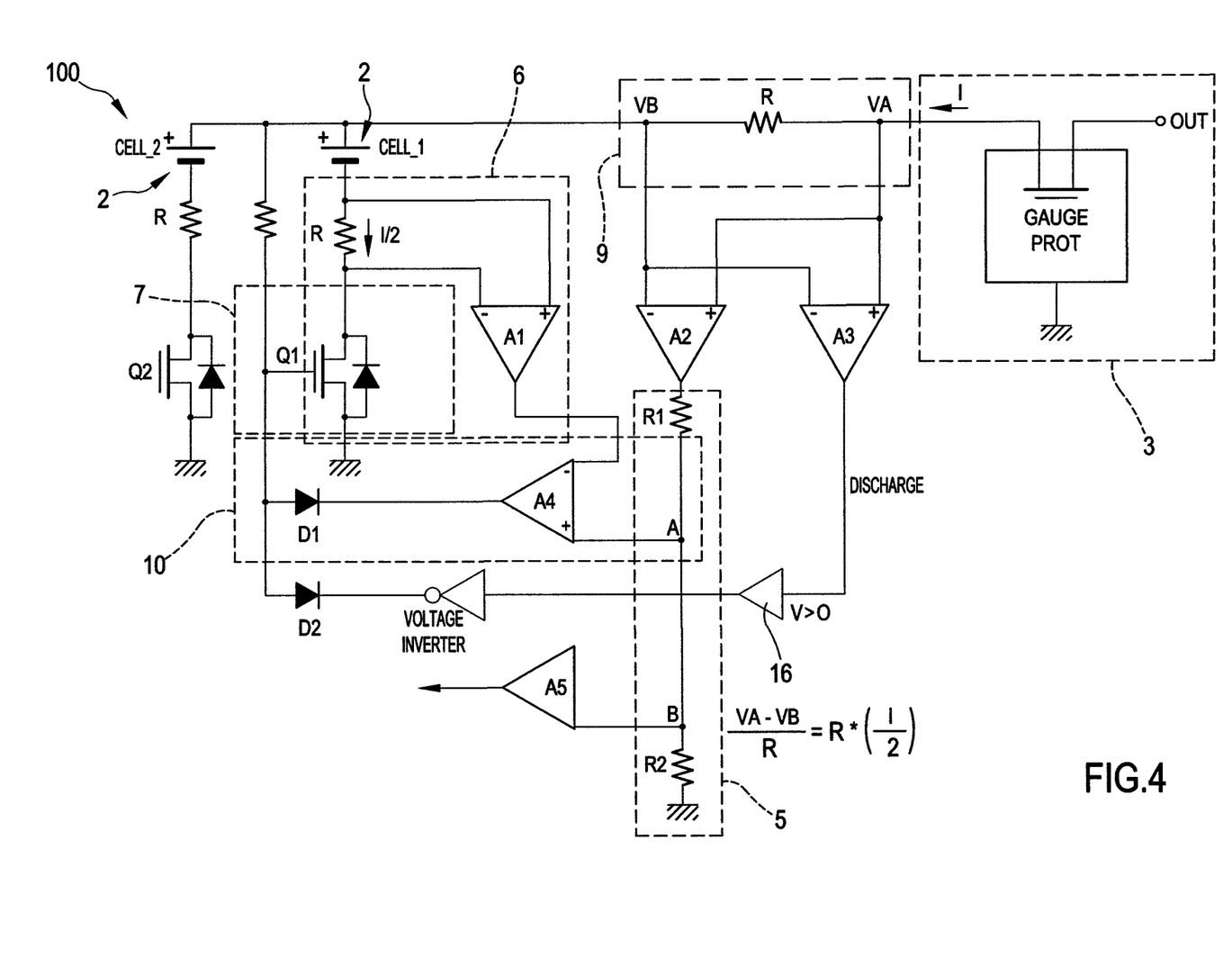
FIG. 4 is a first embodiment of the invention battery charging circuit.

The microprocessor 15 sends as output to the modulators the command signals is I_SET1 and I_SET2. These values are obtained by the microprocessor by using the value of the total current sensed by sensing element 9. In FIG. 4, a different embodiment of the battery charging circuit 100' is depicted. In this embodiment, the sensing element 9 of the total current still includes an electrical resistance R having a voltage difference VA−VB at the ends of the sensing element 9. The voltages VA and VB are fed to the inputs of an operational amplifier A2, the output of which depends on the voltage difference VA−VB (during charging VA>VB). This voltage difference is fed to the partitioner 5, which in this embodiment includes a voltage divider formed by two resistances R1 and R2. Depending on the values of the two electrical resistances R1 and R2, the voltage is divided in a fraction of VA−VB (in this case, being the two cells identical and thus the set currents identical, R1 and R2 are also identical) at node A and at node B (the voltages in these nodes being in this specific case the same). These chosen voltages are values proportional to set currents, that is, the partitioner 5 including the voltage divider selects, depending on the values of the electric resistances included in the voltage divider, the value of the set currents for each cell.

Further, each cell has a resistance R3 positioned in series. An additional operational amplifier A1 is connected with its inverting and non-inverting inputs to the two ends on such a resistance R3. The output of the OP1 thus depends on the current flowing through the cell 2, being the current flowing through the cell and through the resistance R3 the same. A1 thus has the function of cell sensing element as resistance 6 in the previsions embodiment.

The output of A1, proportional to the current flowing in the cell, and the voltage at node A, proportional to the set current for that cell as specified by the partitioner 5, are fed to comparator 10. The comparator 10 includes an operational amplifier A4. The two voltages are thus compared and an output depending on their difference is given. This output is fed as input to the modulator 7, including a MOSFET the drain of which is connected to one end of the cell and the gate is connected to the output of A4.

The modulation of the current in the cell takes place via the modulator 7 as explained in the previous embodiment.

The operational amplifier A5 shown in the figure and not further connected to elements has the same function as A4 for the additional cell. The functioning of the additional cell in the battery pack is not explained herewith, being identical to the one above.

Figure 6:
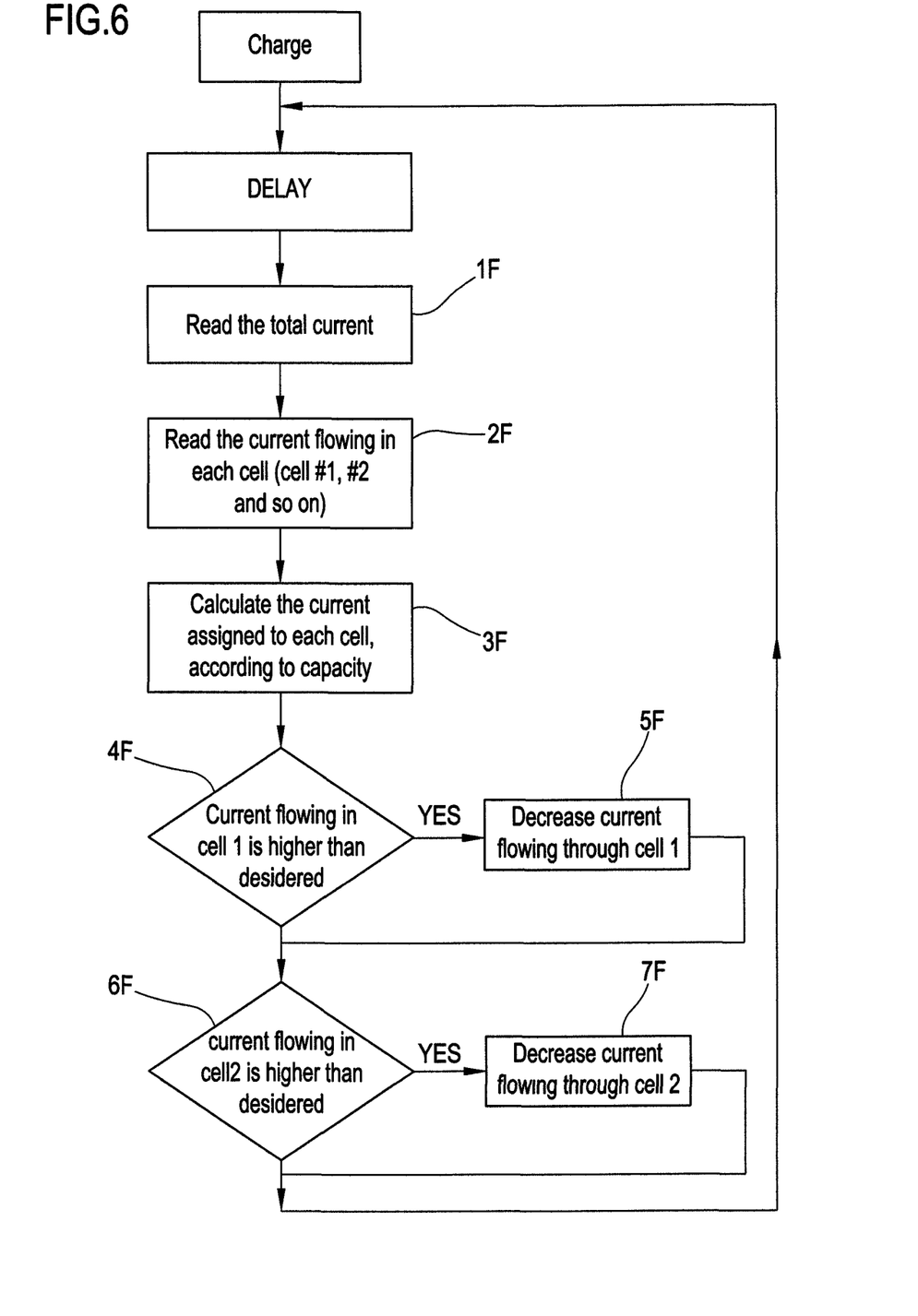
FIG. 6 is a flow chart of a method to charge a battery pack according to the invention.

The functioning of the battery charging circuit during the battery pack charging is depicted in FIG. 6.

The charging of the battery pack starts. The total current ITOT charging the battery pack 1 is first measured (step 1F), for example via sensing element 9. Then the current flowing through the cells 2 is measured as well, for example via the cell sensing elements 6 (step 2F). The desired set currents are then calculated by the partitioner 5, depending on the total current and on the type of cells present in the battery pack (step 3F). Partitioner 5 could be either a voltage divider as in example of FIG. 4 or a microprocessor 15 as in FIG. 5.

It is then detected whether the current flowing through the first cell 2 is higher than desired (step 4F) by means of the comparator 10. If this is the case, then the current flowing into the cell is decreased using modulator 7 (step 5F). The same takes place with cell 2 (step 5F). Comparator 10 includes either an operational amplifier or is included in microprocessor 15.

The above-described process may be repeated until the battery pack 1 is charged.

Figure 7:
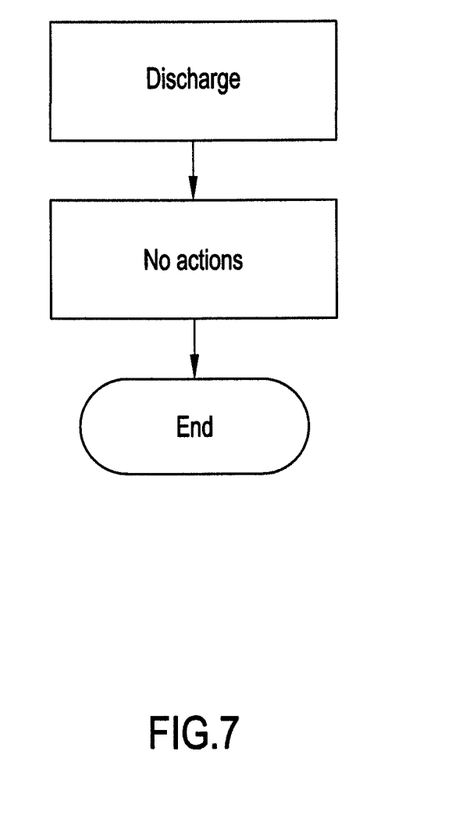
FIG. 7 is a flow chart of a method of discharge a battery pack according to the invention.

The discharge is depicted in FIG. 7. During discharge, an automatic process may occur without any intervention. As shown in FIG. 3, during charging, the current in the modulator 7 flows from the drain to the source. In the discharge, the current flows exactly in the opposite direction. In the latter case, the MOSFET is short-circuited.

In the same manner, in FIG. 4, during discharge the current flows in the opposite direction in resistance R so that in this case VB>VA. The output of A1 and A2 tends to become negative, stopping at zero. A further operational amplifier A3 is thus connected to the two ends of the resistance R. Its non-inverting input has the same potential as the inverting input of A2 and its inverting input has the same potential than the non-inverting input of A2. The output of A3 during charging is below or equal to zero, while now with the reversal of the current direction, becomes positive. The output of A3 is fed to a zero-comparator 16 that outputs a logical 1 only if its input is a voltage above zero. Being this the case, the output of the zero-comparator 16 is connected to the gate of the modulator 7 through a voltage inverter, and thus drives the modulator 7 in such way that it is substantially open; diodes allow current to flow from the cells toward the load (not included in the drawing).

The previous description is of a preferred embodiment for implementing the invention, and the scope of the invention should not necessarily be limited by this description. The scope of the present invention is instead defined by the following claims.

We claim:

1. A method for charging a battery pack including a plurality of cells connected in parallel, the method comprising:
    setting a plurality of set cell charging currents including a respective set cell charging current desired for each cell of the battery pack;
    charging the battery back with a total current (I) from a single current source;
    sensing a plurality of cell currents flowing through each cell of the battery pack;
    comparing a value proportional to each set cell charging current with a respective value proportional to the cell current flowing in the same respective cell;
    modulating the cell current flowing in at least one cell on the basis of the comparison for the respective cell; and
    wherein modulating the cell current in a respective cell includes lowering the cell current flowing in the respective cell if the set charging current desired for the respective cell is lower than the cell current sensed for the comparison for the respective cell, or increasing the cell current flowing in the respective cell if the charging current desired for the respective cell is higher than the cell current sensed for the comparison for the respective cell.

2. The method according to claim 1, wherein setting a plurality of set cell charging currents for each cell of the battery pack, includes;
    dividing the total current into a number of sub-currents equal to the number of cells of the plurality of cells;
    defining each set cell charging current as proportional to one of the sub-currents.

3. The method according to claim 1, including, in a discharge phase:
    uncoupling each cell from the other cells of the plurality by means of ideal diodes.

4. The method according to claim 2, wherein values for each of the sub-currents are identical to each other.

5. The method according to claim 2, wherein values for at least some of the sub-currents are different relative to each other.

6. A battery charging circuit for a battery pack including a plurality of cells connected in parallel and connected to a current source, the battery pack including:
    a sensing element configured to sense a total current provided by the current source;
    a plurality of cell sensing elements configured to sense a cell current flowing through each cell of the plurality;
    a partitioner circuit configured to divide the total current in a number of set cell charging currents equal to the number of cells in the plurality;
    a plurality of comparators, each comparator configured to compare a value proportional to a set cell charging current corresponding to a respective cell with a value proportional to the cell current flowing through the same respective cell;
    a plurality of modulators, each modulator configured to modulate the cell current flowing through the respective cell on the basis of the comparison for the respective cell; and
    wherein modulating the cell current in a respective cell includes lowering the cell current flowing in the respective cell if the set charging current desired for the respective cell is higher than the cell current sensed for the comparison for the respective cell, or increasing the cell current flowing in the respective cell if the charging current desired for the respective cell is lower than the cell current sensed for the comparison for the respective cell.

7. The battery charging circuit according to claim 6, wherein each modulator of the plurality is connected in series with its respective cell.

8. The battery charging circuit according to claim 7, wherein each comparator drives a corresponding modulator for its respective cell.

9. The battery charging circuit according to claim 6, wherein the comparator includes an operational amplifier in a comparator configuration, having as inputs a value proportional to the set cell charging current corresponding to its respective cell, and a value proportional to the cell current flowing through the same respective cell.

10. The battery charging circuit according to claim 9, wherein the modulator includes a transistor, a collector of the transistor being connected to one end of the respective cell.

11. The battery charging circuit according to claim 10, wherein the base of the transistor is connected to an output of the comparator.

12. The battery charging circuit according to claim 7, wherein the partitioner circuit is included in a microprocessor.

13. The battery charging circuit according to claim 12, wherein the microprocessor is configured to generate the set cell charging current for each cell and to receive a signal proportional to the cell current flowing through each cell.

14. The battery charging circuit according to claim 7, wherein the partitioner circuit includes a voltage divider.

15. The battery charging circuit according to claim 7, comprising a plurality of diodes, each diode being in series with a corresponding modulator.

16. The battery charging circuit according claim 7, wherein the sensing element or the cell sensing element includes an electrical resistance.

17. The battery charging circuit according to claim 7, including a current to voltage converter to transform a current signal into a voltage signal.

18. The battery charging circuit according to claim 6, further comprising a protection circuit coupled between the battery pack and an external source, the protection circuit configured to measure at least one of cell voltages, integrated pack current, or temperature.

* * * * *